United States Patent [19]

Usui et al.

[11] Patent Number: 5,027,495
[45] Date of Patent: Jul. 2, 1991

[54] METHOD OF FIXING PIPE WITH PLATE-LIKE SUPPORT

[75] Inventors: Masayoshi Usui, Mumazu; Katsushi Washizu, Numazu, both of Japan

[73] Assignee: Usui Kokusai Sangyo Kaisha Ltd., Japan

[21] Appl. No.: 438,697

[22] Filed: Nov. 17, 1989

[30] Foreign Application Priority Data

Nov. 26, 1988 [JP] Japan .................. 63-299250
Nov. 26, 1988 [JP] Japan .................. 63-299251
Dec. 30, 1988 [JP] Japan .................. 63-332183

[51] Int. Cl.$^5$ .................. F16L 5/00; F16L 21/08
[52] U.S. Cl. .................. 29/450; 29/451; 29/890.043; 165/173; 165/178; 285/194; 403/243
[58] Field of Search .......... 29/451, 450, 890.038, 29/890.04, 890.043; 165/173, 178; 285/194, 217; 403/240, 243

[56] References Cited

U.S. PATENT DOCUMENTS

| | | | |
|---|---|---|---|
| 1,310,758 | 7/1919 | Levin | 285/194 |
| 1,530,617 | 3/1925 | Porter | 285/194 |
| 1,566,145 | 12/1925 | Larson | 285/194 |
| 2,164,547 | 7/1939 | Smith | 285/194 X |
| 2,542,442 | 2/1951 | Weber | 29/451 X |
| 2,948,773 | 8/1960 | Hawes | 29/451 |

*Primary Examiner*—Joseph M. Gorski
*Attorney, Agent, or Firm*—Anthony J. Casella; Gerald E. Hespos

[57] ABSTRACT

The present invention provides a method of fixing a pipe by using a plate-like support with the said of an elastic holding piece or pieces. The plate-like support has a fitting hole through which it is fixed to the structure related to the pipe and a pipe clamping hole through which the pipe is inserted. Further, the elastic holding piece has a flat bottom surface and is provided with an engaging wall and an engaging claw at the front and rear ends thereof, respectively, with the provision of an engaging groove therebetween and the pipe has at least a flat portion on the outer periphery thereof. Accordingly, when the pipe is inserted into the clamping hole of the plate-like support after the holding piece is attached to the pipe, the engaging groove of the holding piece is brought into engagement with the inner periphery of the pipe clamping hole of the plate-like support with the bottom surface of the holding piece being in contact with the flat portion of the pipe. The method of the invention eliminates the disadvantages of the conventional method and assures a tight fixing of the pipe with respect to the structure related thereto without the possibility of deteriorating the strength of the pipe.

15 Claims, 3 Drawing Sheets

PRIOR ART

METHOD OF FIXING PIPE WITH PLATE-LIKE SUPPORT

BACKGROUND OF THE INVENTION

1. Field of the Invention

The present invention relates to a method of fixing a metallic pipe or a resin tube (hereinafter referred to as the "pipe") of a comparatively small diameter (e.g. less than about 30 m/m) by using plate-like supports, with the pipe being generally used as an oil or air supply path for automobiles or other various kinds of machines and devices.

2. Description of the Prior Art

The conventional fixing methods of the above type have been such that as shown in FIG. 17 for example, a metallic pipe P' is passed through a clamping hole 12 drilled in a metallic support 11 and in that state, the inner peripheral portion of the hole is brazed thereby fixing the pipe to the metallic support and in the case of a resin tube, the tube is fixed by being clamped by a clip (not shown).

However, the above-described conventional fixing methods have had the following disadvantages. That is, in the case of the former, brazing by manual heating is troublesome because the mechanical strength of the pipe near the brazed portion often deteriorates due to local heating causing cracks or damages on the pipe and since the pipe and metallic support are required to be subjected to plating against corrosion after brazing, the productivity is hindered to a great degree, while in the case of the latter, it often takes place that the resin tube moves in the axial direction or turns in the circumferential direction which, when a vibratory force is applied on the tube, leads to the dislocation or separation of the tube from the clamping wall of the clip.

SUMMARY OF THE INVENTION

The present invention has been made to eliminate the above-mentioned problems involved in the conventional fixing methods and an object of the invention is to provide a pipe fixing method by which the troublesome fixing operation and the fear of deterioration of the mechanical strength of the fixed portion of the pipe are eliminated, the use of a pre-plated metallic support and pipe is made possible thereby improving the productivity, the vibration-proof property of the fixed portion of the pipe is improved, the displacement of the pipe or the coming off of the surface treatment on the pipe or fretting thereof due to contact with the metallic support can be prevented and the possibility of separation or dislocation of the pipe with respect to the clamping hole of the metallic support is eliminated even when a vibratory force is applied on the pipe.

In order to achieve the above object, the gist of a first embodiment of the present invention resides in that a semicircular elastic holding piece is attached to a flat portion of a pipe and the pipe is passed through a clamping hole drilled in a plate-like support having a fitting hole through which it is fixed to a related structure. The elastic holding piece has a substantially flat bottom surface and provided with an engaging wall and an engaging claw at front and rear ends of the outer periphery thereof, respectively, so as to provide an engaging groove therebetween so that when the pipe is passed through the clamping hole of the plate-like support, the bottom surface of the holding piece is applied to the flat portion of the pipe and the engaging groove thereof is partially brought into engagement with the inner periphery of the clamping hole of the plate-like support.

Next, the gist of a second embodiment of the present invention resides in that two elastic holding pieces similar in shape to that mentioned in the first embodiment are attached to a pipe having two flat portions on the outer periphery thereof in opposite relationship with each other so that when the pipe with such holding pieces attached thereon is passed through the clamping hole of the above-mentioned plate-like support, it is held fixed to the metallic support with the two holding pieces being brought into tight engagement with the inner periphery of the clamping hole of the metallic support.

Further, the gist of a third embodiment of the present invention resides in that a bifurcated elastic holding piece in the shape of C having substantially a flat bottom surface and provided with an engaging wall and an engaging claw at front and rear ends of the outer periphery thereof, respectively, so as to provide an engaging groove therebetween is attached to a pipe having a flat portion on the outer periphery thereof and the pipe is then passed through a clamping hole of a plate-like support same as that mentioned in the preceding embodiments so that the pipe is held fixed to the plate-like support with the engaging groove of the holding piece brought into engagement with the inner periphery of the clamping hole of the plate-like support while the flat bottom surface thereof being in contact with the flat portion of the pipe. In this case, the pipe may be provided with two flat portions on the outer periphery thereof in opposite relationship with each other and two such holding pieces may be applied to the flat portions of the pipe, respectively, as in the case of the preceding second embodiment.

Thus, according to the present invention, the pipe has at least a flat portion on the outer periphery thereof and is attached with the holding piece of the above-mentioned structure having a flat bottom surface coming into contact with the flat portion of the pipe so that when it is inserted into the clamping hole of the plate-like support, the rotation thereof with respect to the metallic support is prevented and the axial movement thereof is also prevented because both front and rear ends of the flat bottom surface of the holding piece are in engagement with the stepped front and rear ends of the flat portion of the pipe. Moreover, due to the insertion of the elastic holding piece between the outer periphery of the pipe and the inner periphery of the clamping hole of the plate-like support, it is easy to obtain a pipe fixing structure having an improved vibration-proof property.

BRIEF DESCRIPTION OF THE DRAWING

It should be noted that in the drawings, like parts are designated by like reference numerals.

DETAILED DESCRIPTION OF THE INVENTION

Figure 1:
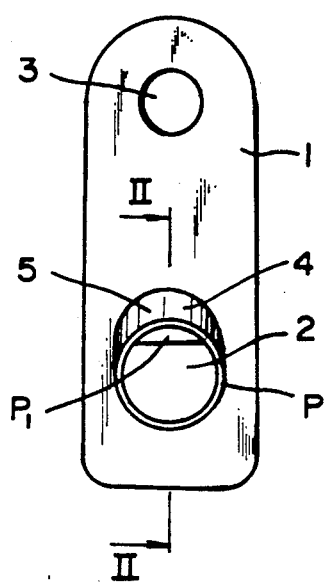
FIG. 1 is a plan view of a plate-like support fixing a pipe by use of a holding piece according to a pipe fixing method as one embodiment of the present invention.
Figure 2:
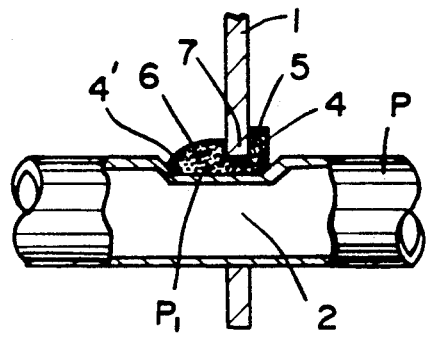
FIG. 2 is a sectional view (partly broken) taken along the A—A line of FIG. 1.
Figure 3:
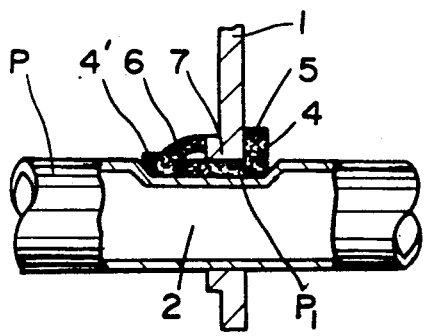
FIG. 3 is a sectional view similar to FIG. 2 and in which a modified holding piece is used.
Figure 4A:
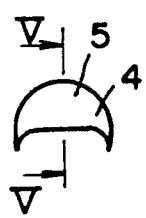
FIGS. 4A and 4B are plan views of the holding pieces, respectively, shown in FIGS. 2 and 3.
Figure 4B:
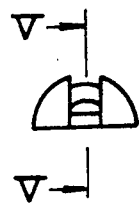
Figure 4C:
FIGS. 4C and D are plan views of holding pieces of different types, respectively, used in the present invention.
Figure 4D:
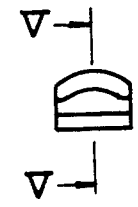
Figure 5A:
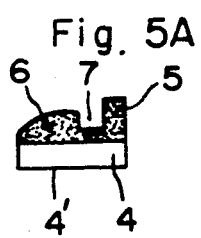
FIGS. 5A through 5D are sectional views, respectively, each taken along the V—V line of each of FIGS. 4A through 4D.
Figure 5B:
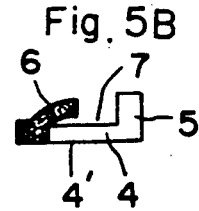
Figure 5C:
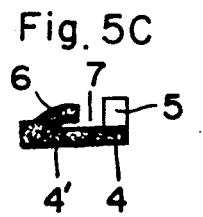
Figure 5D:
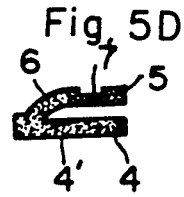

In FIGS. 1 through 7, reference numeral 1 designates a plate-like metallic support in the form of a clamp or bracket having a fitting hole 3 through which it is attached to a related structure and a clamping hole 2 through which a pipe P is inserted. Reference numeral 4 designates an elastic holding piece formed of a semicircular flat metallic spring, resin or rubber material or a combination thereof. The holding piece 4 is provided at the front end thereof with an engaging wall 5 projecting radially and outwardly with respect to the pipe P and at the rear end thereof with a snap engaging claw 6 (FIG. 3 and FIGS. 4B and 4C) in correspondence to the engaging wall 5 so that there is formed an engaging groove 7 therebetween. As an alternative, the engaging claw 6 may be in the form of an elastic arm (FIG. 4D) extending outwardly of the rear end of a bottom surface 4' thereof. To support the pipe P with the metallic support 1, the holding piece 4 is first fixed to the pipe P having a flat portion P1 on the outer periphery thereof in such a manner that the bottom surface 4' of the holding piece 4 comes into contact with the flat portion P1 of the pipe P. Then the pipe P is passed through the clamping hole 2 of the metallic support 1 so that the flat portion of the pipe engages the inner peripheral wall of the clamping hole 2.

Figure 6:
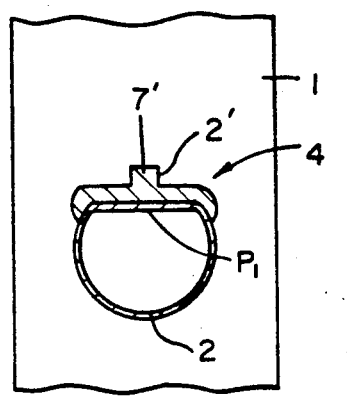
FIGS. 6 and 7 are rear sectional views of further different types of holding pieces, respectively.
Figure 7:
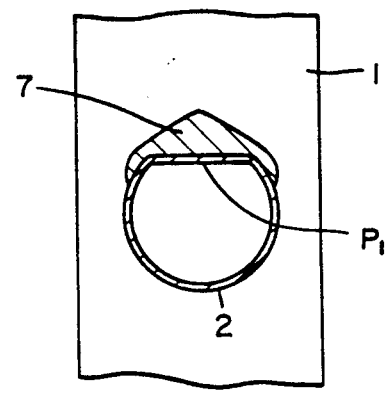

If desired, the inner peripheral surface of the clamping hole 2 of the metallic support 1 may be provided with a projection extending in the direction of the axis of the pipe P (FIG. 3) so that the top end of the engaging claw 6 is brought into contact therewith, or it may be provided with a cutout 2' and the holding piece 4 may be provided with a projection 7' at the root portion or the outer peripheral portion of the engaging claw 6 so as to prevent the movement of the holding piece 4 (FIG. 6). Further, for the same purpose, the configuration of the clamping hole 2 of the metallic support 1 may be made polygonal and the outer periphery of the engaging groove 7 of the holding piece 4 may also be made polygonal so as to mate with the hole 2 (FIG. 7). Moreover, the length of the flat portion P1 of the pipe P may be made larger than the axial length of the mating surface 4' of the holding piece 4 (though not shown) according to necessity so that the position of the metallic support 1 with respect to the pipe P may be adjusted. In addition, as regards the fixing position of the metallic support 1, the fitting hole 3 of the metallic support may be made twistable or bendable so that the axis thereof may lie normal to that of the pipe P or at a certain angle of inclination with respect to the latter.

Figure 8:
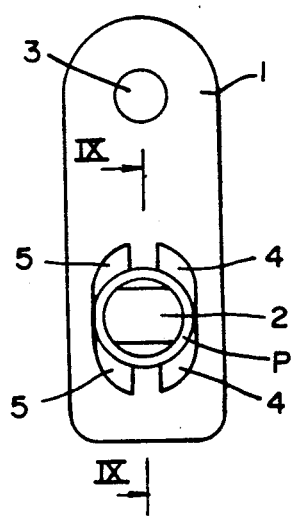
FIG. 8 is a plan view of a plate-like support fixed to a pipe attached with two holding pieces according to a pipe fixing method as another embodiment of the present invention.
Figure 9:
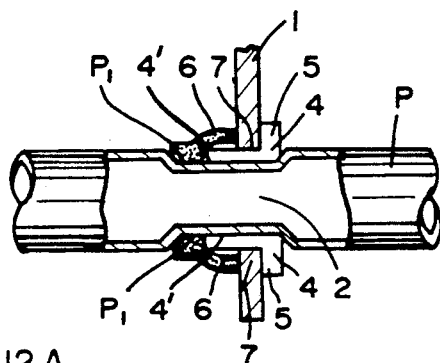
FIG. 9 is a sectional view taken along the IX—IX line of FIG. 8.
Figure 12A:
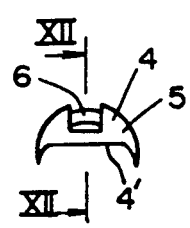
FIG. 12A is a plan view of the holding piece shown in FIG. 8.
Figure 12B:
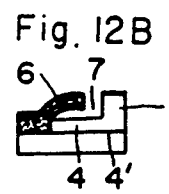
FIG. 12B is a sectional view taken along the XII—XII line of FIG. 12A.
Figure 10:
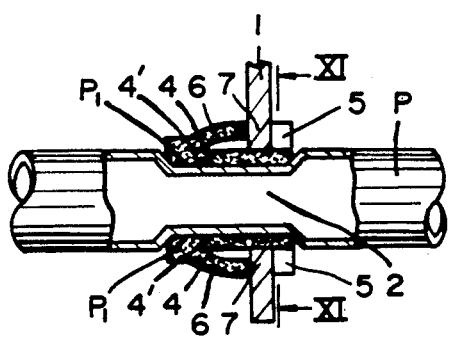
FIG. 10 is a view similar to FIG. 9 and in which a modified holding piece is shown in use.
Figure 11:
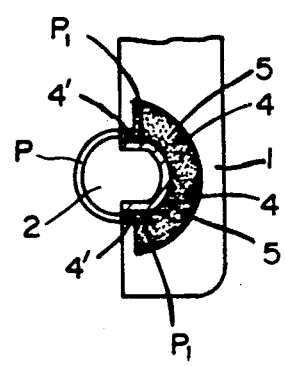
FIG. 11 is a sectional view taken along the XI—XI line of FIG. 10.
Figure 13:
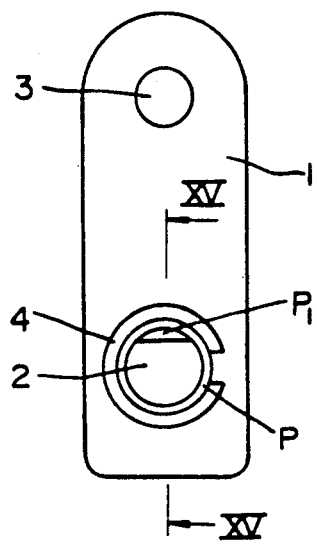
FIG. 13 is a plan view of a plate-like support fixing a pipe by use of a holding piece of a modified type according to a pipe fixing method as a further embodiment of the present invention.
Figure 14:
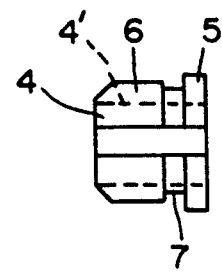
FIG. 14 is a side view of the holding piece shown in FIG. 13.
Figure 15:
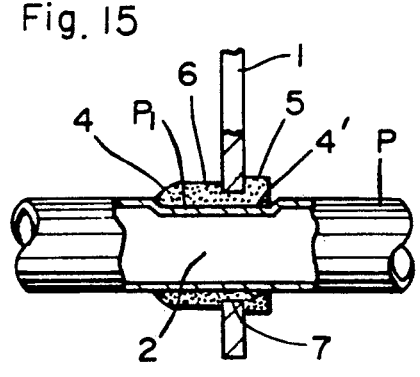
FIG. 15 is a sectional view taken along the XV—XV line of FIG. 13.

Referring to FIGS. 8 through 12 which show an embodiment other than that described in the foregoing although structural difference between them is slight, the pipe P is formed to have two flat portions P1, P1 on the outer periphery thereof in opposite relationship with each other and two elastic holding pieces 4, 4 each having a bottom surface 4' are attached to the pipe P with the bottom surfaces of the holding pieces contacting with the flat portions P1, P1 of the pipe, respectively. It should be noted that the holding pieces 4, 4 in FIGS. 8 and 9 are similar to the holding piece 4 in FIG. 12 and the holding pieces in FIGS. 10 and 11 are similar to that in FIGS. 4C and 5C.

Further, referring to FIGS. 13 through 16, each of the elastic pieces 4, 4 is bifurcated substantially to the form of C with the lower peripheral surface thereof forming a substantially flat bottom surface 4'. In addition, like the embodiments described hereinbefore, the holding piece has on its outer peripheral surface an engaging wall 5 and an engaging claw 6 with the provision of an engaging groove 7 therebetween. Thus, with such structure, the holding piece 4 is fixed to the flat portion P1 of the outer periphery of the pipe P and in turn the pipe P is passed through the clamping hole 2 of the metallic support 1.

Figure 16:
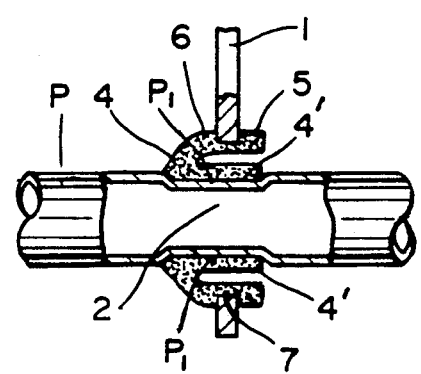
FIG. 16 is a view similar to FIG. 15 and in which two bifurcated holding pieces are shown in use.
Figure 17:
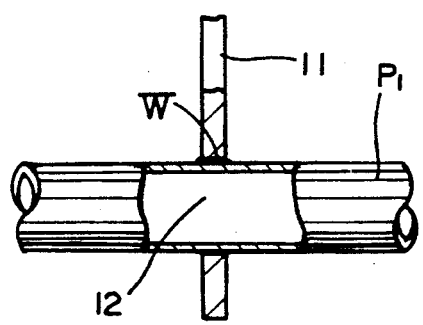
FIG. 17 is a sectional view of a pipe inserted into a metallic support according to a conventional pipe fixing method.

If desired, an additional holding piece of the same shape as the above-described one may be used in opposite relationship with the latter and another flat portion P1 may be formed on the pipe in opposite relationship with the first flat portion P1 such that the flat bottom surfaces 4', 4' of both of the holding pieces come into contact with the two flat portions P1, P1 of the pipe P, respectively, as shown in FIG. 16.

All the embodiments as described hereinabove adopt the plate-like metallic support. However, according to the present invention a plate-like support made of, for example, plastic material other than the metallic material may also be employed.

As described above, the pipe fixing method by means of the plate-like support according to the present invention is characterized in that the pipe P is held fixed to the inner periphery of the clamping hole 2 of the metallic support 1 by the engagement of the flat bottom surface 4' of the elastic holding piece 4 with the flat portion P1 on the outer periphery of the pipe P and the engagement between both ends of the lat bottom surface 4' of the holding piece 4 and the steps formed at both ends of the flat portion P1 at the pipe P in the axial direction so that the pipe is easily fixed to the metallic support and at the same time, there is no fear of deteriorating the mechanical strength of the pipe at the fixed portion thereof. Further, as it is possible to use the metallic support 1 and the pipe P after they are subjected to plating, the productivity is improved due to the absence of pre- and after-treatments of the pipe and the metallic support. In addition, due to the secured fixing, the displacement of the pipe in the axial direction, separation or dislocation thereof at the fixed portion are avoided and the exfoliation of the plating or fretting of the pipe is prevented by the existence of the bottom surface of the engaging groove 7 of the elastic holding piece 4 thereby providing an excellent vibration-proof fixing.

What is claimed is:

1. A method of fixing a pipe by using a plate-like support, characterized by the steps of:
    providing a pipe having at least front and rear longitudinally extending generally cylindrical sections and a mounting section disposed between the front and rear sections, said mounting section comprising at least one flat portion of a selected length along the pipe;
    providing a plate-like support having a thickness less than the length of the flat portion of the pipe;
    drilling a pipe clamping hole through the plate-like support, said pipe clamping hole being dimensioned to receive the pipe therethrough;
    providing an elastic holding piece having at least a substantially flat bottom surface, defining opposed front and rear ends and being dimensioned to fit on the flat portion of the pipe between the front and rear sections, the holding piece further including an engaging wall and an engaging claw formed at the front and rear ends thereof, respectively, the engaging wall and engaging claw extending outwardly and providing an engaging groove therebetween on a side of the holding piece opposite the flat bottom surface
    attaching the flat bottom surface of the holding piece to the flat portion of the pipe; and
    passing said pipe and the holding piece attached thereto through said pipe clamping hole of said plate-like support so that the engaging wall and the engaging claw of said holding piece on said pipe is brought into tight contact with portions of the plate-like support adjacent said pipe clamping hole.

2. The method according to claim 1, wherein said elastic holding piece is semicircular in section.

3. A method according to claim 2 wherein the engaging claw of said holding piece extends axially toward the engaging wall and is resiliently deflectable, such that the engaging claw takes a snap action after passing through the pipe clamping hole and clutches said plate-like support with said engaging wall.

4. The method according to claim 2, wherein an outer peripheral portion of said holding piece is partly separated from the bottom surface thereof.

5. The method according to claim 1, wherein said elastic holding piece is bifurcated substantially in the shape of C in section.

6. The method according to claim 1, wherein the pipe clamping hole of said plate-like support is provided with a projection.

7. A method according to claim 1, wherein said pipe is provided with two flat portions on the outer periphery thereof in opposite relationship with each other and wherein the step of providing an elastic holding piece comprises providing two holding pieces similar in shape and wherein the step of attaching the flat bottom surface of the holding piece comprises attaching each said elastic holding piece to said two flat portions of said pipe, respectively.

8. The method according to claim 1, wherein locking means is provided between said plate-like support and said elastic holding piece so that movement of said elastic holding piece relative to said plate-like support is prevented.

9. The method according to claim 8, wherein said locking means comprises a cutout formed at the inner periphery of the pipe clamping hole drilled in said plate-like support and a projection formed on the engaging claw coming into engagement with said cutout.

10. The method according to claim 8, wherein said locking means comprises a polygonal clamping hole drilled in said plate-like support and a polygonal engaging groove formed on said holding piece so as to mate with said polygonal clamping hole.

11. The method according to claim 1, wherein said pipe is made to have two flat portions on the outer periphery thereof in opposite relationship with each other and two elastic holding pieces each having a substantially flat bottom surface are attached to said pipe with said flat bottom surfaces brought into contact with said flat portions of said pipe, respectively.

12. The method according to claim 1, wherein said elastic holding piece is made of a material selected from at least one of a metallic spring, synthetic resin material and rubber.

13. A method of fixing a pipe comprising the steps of: providing a plate-like support having a fitting hole through which the plate-like support is fixed to a related structure; drilling a pipe clamping hole through the plate-like support in spaced relationship to the filling hole; providing a pipe with front and rear cylindrical sections dimensioned to fit through the pipe clamping hole of the plate-like support and a flat portion on the outer periphery thereof intermediate the front and rear cylindrical sections and defining a smaller cross-section than the front and rear cylindrical sections; providing a semicircular elastic holding piece having a substantially flat bottom surface dimensioned to fit on the flat portion of the pipe and provided with an engaging wall and an engaging claw at front and rear ends thereof, respectively, the engaging wall and engaging claw forming an engaging groove therebetween on a side of the holding piece opposite the flat bottom surface thereof; attaching the flat bottom surface of the elastic holding piece to said flat portion of said pipe; and passing said pipe with said holding piece attached thereto through the pipe clamping hole drilled in said plate-like support so that the engaging groove of said holding piece is brought into engagement with portions of the plate-like support adjacent the inner periphery of said pipe clamping hole of said plate-like support.

14. A method of fixing a pipe comprising the steps of: providing a plate-like support having a fitting hole through which the plate-like support is fixed to a related structure, drilling a pipe clamping hole through the plate-like support, providing a pipe with front and rear cylindrical sections dimensioned to fit through the pipe clamping hole of the plate-like support and with two flat portions on the outer periphery thereof in opposite relationship with each other and intermediate the front and rear cylindrical sections, providing two semispherical elastic holding pieces each having a flat bottom surface and each provided with an engaging wall and an engaging claw at front and rear ends of the outer periphery thereof, respectively, the engaging wall and the engaging claw forming an engaging groove therebetween on a side of each holding piece opposite the flat bottom surface, attaching the holding pieces to said pipe with the flat bottom surfaces of said holding pieces being in contact with the flat portions of said pipe, respectively, and passing said pipe with said holding pieces thereon through the pipe clamping hole drilled in said plate-like support so that the portion of the plate-like support defining the inner periphery of said pipe clamping hole is brought into engagement with said engaging groove of each of said elastic holding pieces.

15. A method of fixing a pipe comprising the steps of: providing a plate-like support having a fitting hole through which the plate-like support is fixed to a related structure, drilling a pipe clamping hole through the plate-like support, providing a pipe with front and rear cylindrical sections dimensioned to fit through the pipe clamping hole of the plate-like support and a flat portion on the outer periphery thereof intermediate the front and rear cylindrical sections, providing a bifurcated elastic holding piece in the shape of C in section having a flat bottom surface and provided with an engaging wall and an engaging claw at front and rear ends of the outer periphery thereof, respectively, the engaging wall and engaging claw forming an engaging groove therebetween on a side of the elastic holding piece opposite the flat bottom surface, attaching the flat bottom surface to the flat portion of said pipe, and passing said pipe with said holding piece thereon through the pipe clamping hole of said plate-like support so that portions of the plate-like support adjacent the inner periphery of said pipe clamping hole is partially brought into tight engagement with the engaging groove of said elastic holding piece.

* * * * *